US009141166B2

(12) United States Patent (10) Patent No.: US 9,141,166 B2
Sistla et al. (45) Date of Patent: Sep. 22, 2015

(54) METHOD, APPARATUS, AND SYSTEM FOR ENERGY EFFICIENCY AND ENERGY CONSERVATION INCLUDING DYNAMIC CONTROL OF ENERGY CONSUMPTION IN POWER DOMAINS

(75) Inventors: Krishnakanth V. Sistla, Beaverton, OR (US); Martin T. Rowland, Beaverton, OR (US); Cesar A. Quiroz, Santa Clara, CA (US); Joseph R. Doucette, Waltham, MA (US); Gopikrishna Jandhyala, Milpitas, CA (US); Kai Cheng, Portland, OR (US); Celeste M. Brown, Tacoma, WA (US); Avinash N. Ananthakrishnan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 13/324,932

(22) Filed: Dec. 13, 2011

(65) Prior Publication Data

US 2012/0185706 A1 Jul. 19, 2012

(51) Int. Cl.
*G06F 13/14* (2006.01)
*G06F 1/26* (2006.01)
*G06F 1/32* (2006.01)

(52) U.S. Cl.
CPC ............ *G06F 1/3203* (2013.01); *G06F 1/3206* (2013.01)

(58) Field of Classification Search
CPC .............................. G06F 1/3203; G06F 1/3206
See application file for complete search history.

(56) References Cited

U.S. PATENT DOCUMENTS

| 7,581,122 | B2 * | 8/2009 | Kim et al. ...................... 713/300 |
| 8,639,958 | B2 * | 1/2014 | Belluomini et al. .......... 713/323 |
| 8,694,719 | B2 * | 4/2014 | Lassa et al. ................... 711/103 |
| 8,700,932 | B2 * | 4/2014 | Belluomini et al. .......... 713/320 |
| 2005/0136989 | A1 * | 6/2005 | Dove ............................ 455/572 |
| 2011/0060932 | A1 | 3/2011 | Conroy et al. |
| 2011/0137763 | A1 | 6/2011 | Aguilar |
| 2012/0331207 | A1 * | 12/2012 | Lassa et al. ................... 711/103 |

FOREIGN PATENT DOCUMENTS

TW 200817887 A 4/2008

OTHER PUBLICATIONS

Taiwan Patent Office, Office Action Mailed Sep. 1, 2014, in Taiwan Application No. 101145278.

* cited by examiner

*Primary Examiner* — M Elamin
(74) *Attorney, Agent, or Firm* — Trop, Pruner & Hu, P.C.

(57) ABSTRACT

An apparatus, method and system is described herein for dynamic power control of a power domain. A power limit over a time window is provided. And over a control loop period a power interface determines energy consumption of the power domain, intelligently budgets power among devices within the power domain based on the energy consumption, converts those budgets to performance maximums for the power domain, and limits performance of devices in the power domain to the performance maximums utilizing a running average power limit.

16 Claims, 9 Drawing Sheets

METHOD, APPARATUS, AND SYSTEM FOR ENERGY EFFICIENCY AND ENERGY CONSERVATION INCLUDING DYNAMIC CONTROL OF ENERGY CONSUMPTION IN POWER DOMAINS

FIELD

This disclosure pertains to energy efficiency and energy conservation in integrated circuits, as well as code to execute thereon, and in particular but not exclusively, to dynamic control of power domains.

BACKGROUND

Advances in semi-conductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computers consume a substantial amount of the entire electricity supply for the United States of America.

As a result, there is a vital need for energy efficiency and conservation associated with integrated circuits. And as servers, desktop computers, notebooks, ultrabooks, tablets, mobile phones, processors, embedded systems, etc. become even more prevalent (from inclusion in the typical computer, automobiles, and televisions to biotechnology), the effect of computing device sales stretches well outside the realm of energy consumption into a substantial, direct effect on The United States economy, as computing device related sales already have a large causal relationship with The United States Gross Domestic Product. Moreover, computer sales internationally have drastically increased; especially in emerging markets.

When power consumption becomes more of a factor, the trend towards always increasing performance is now being counterbalanced with power consumption concerns. For example, some power capping technologies, such as those utilized in data centers, ensure power doesn't exceed a limit. However, within platforms or single integrated circuits, power consumption and regulation has predominately been decentralized and uncoordinated. As an example, in a typical server, the memory subsystem may consume as much as ⅓ of the total power budget for a platform. Yet, up until now memory has not been incorporated in a platform power budget. So, even if a power cap is placed on the server, ⅓ of the power consumption resides outside the budget, which potentially significantly limits power saving opportunities.

Furthermore, even components that fall within the power budget are often not efficiently managed. Previously, static power capping limits may be set on components according to an overall budget. But the static limits typically include guard bands (headroom for error associated with static assumptions that are not dynamically tailored to a platform or component), which limit the potential for power savings. Moreover, such capping techniques are often worse for burst-like workloads, such as memory. As a result, there is currently no efficient way of dynamically translating a power limit to a domain and/or component that maximizes performance for a given power limit.

BRIEF DESCRIPTION OF THE DRAWINGS

The present invention is illustrated by way of example and not intended to be limited by the figures of the accompanying drawings.

DETAILED DESCRIPTION

Figure 1:
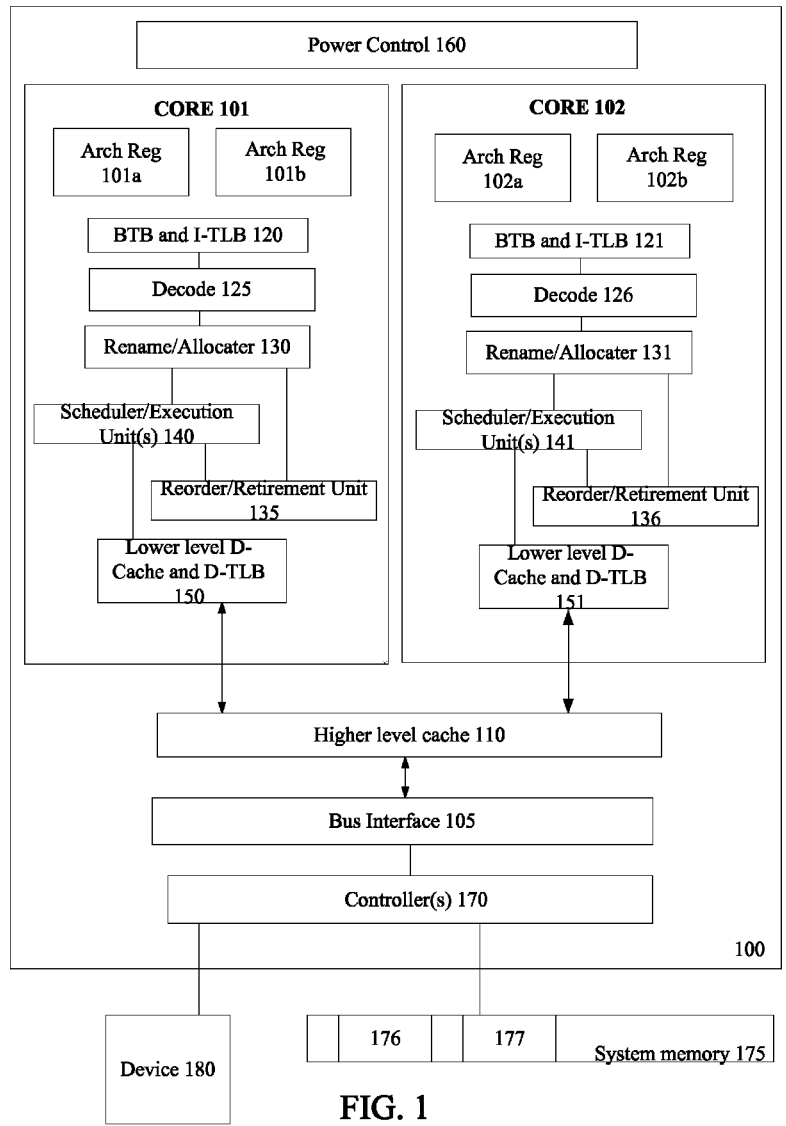
FIG. 1 illustrates an embodiment of a logical representation of a system including processor having multiple processing elements (2 cores and 4 thread slots).

In the following description, numerous specific details are set forth, such as examples of specific types of specific processor and system configurations, specific hardware structures, specific architectural and micro architectural details, specific register configurations, specific algorithms for determining energy consumption, specific types of performance metrics, specific power domain configurations, specific device types, specific conversion of power limits to energy budgets, specific power related measurements, etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific memory controller configurations, specific memory controller transaction format and scheduling, specific performance metric throttling techniques, specific measurement techniques, specific firmware code, specific interconnect operation, and other specific operational details of processors haven't been described in detail in order to avoid unnecessarily obscuring the present invention.

Although the following embodiments are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems. And may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

The method and apparatus described herein are for dynamic control of a power domain. Specifically, dynamic control of a power domain is primarily discussed below in reference to a memory power domain. Yet, the apparatus' and methods described herein are not so limited, as they may be implemented in conjunction with alternative power domains including any type of devices (either symmetric or asymmetric devices). For example, dynamic control of a power domain may be utilized for a multiprocessor system, where the power domain is the entire platform, the multiple processors, multiple cores of a processor, I/O devices, or any other known grouping or domain of computing devices. Or it may be utilized in small form-factor devices, handheld devices, SOCs, or embedded applications, as discussed above. Here, a power domain may include any number of asymmetric devices with unique power characteristics to be considered against an overall power limit over time.

Referring to FIG. 1, an embodiment of a processor including multiple cores is illustrated. Processor 100 includes any processor or processing device, such as a microprocessor, an embedded processor, a digital signal processor (DSP), a network processor, a handheld processor, an application processor, a co-processor, or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. Yet to further the discussion, the functional units illustrated in core 101 are described in further detail below, as the units in core 102 operate in a similar manner.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e. four logical processors or processing elements capable of executing four software threads concurrently. As eluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in rename allocater logic 130 may also be replicated for threads 101a and 101b. Some resources, such as reorder buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101*a*, 101*b*, respectively. Usually core 101 is associated with a first Instruction Set Architecture (ISA), which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

In the depicted configuration, processor 100 also includes bus interface module 105. Historically, controller 170, which is described in more detail below, has been included in a computing system external to processor 100. In this scenario, bus interface 105 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include dynamic random access memory (DRAM), static RAM (SRAM), non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 170 is illustrated as part of processor 100. Recently, as more logic and devices are being integrated on a single die, such as System on a Chip (SOC), each of these devices may be incorporated on processor 100. For example in one embodiment, memory controller hub 170 is on the same package and/or die with processor 100. Here, a portion of the core (an on-core portion) includes one or more controller(s) 170 for interfacing with other devices such as memory 175 or a graphics device 180. The configuration including an interconnect and controllers for interfacing with such devices is often referred to as an on-core (or un-core configuration). As an example, bus interface 105 includes a ring interconnect with a memory controller for interfacing with memory 175 and a graphics controller for interfacing with graphics processor 180. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

In one embodiment, processor 100 is capable of dynamically controlling a power domain. A power domain, in one embodiment, includes an grouping of devices that is meaningful from a power delivery or power limiting perspective. A domain may be either homogeneous (same device type) or heterogeneous (different component or device types). In one embodiment, a memory power domain includes memory coupled to a memory controller, such as any memory devices (e.g. system memory 175) coupled to controller 170.

Dynamic control of a power domain includes controlling power of a power domain during runtime. As a first example, power delivered to a power domain may be limited or controlled at a supply. However, regulating power purely at the supply is potentially inefficient in balancing power demands between multiple devices of a power domain. And even though power has become an extremely important concern, performance is still a vital factor as well. Therefore, as another example, a power limit is set for a power domain over a quantum of time (a time window). And the power consumption of the domain (either as an entire domain and/or on a per device basis) is dynamically budgeted and enforced over the quantum of time to meet the power limit.

Note that the power limit may be set in any manner. For example, a platform level power manager determines how power is to be distributed across multiple domains in a computing system over time. Or a power domain may self-regulate (i.e. determine a reasonable power limit over time based on current conditions). As another example, a mode of operation or user may specify a power limit for one or more domains. In fact, any known method of providing a power limit for a device or computing system may be applied to specifying a power limit for a power domain.

To budget and enforce consumption within a domain in regards to a power limit, power module 160, which is illustrated in processor 100 but may be placed anywhere in a computing system, is to determine consumption of the power domain. Here, determining consumption is potentially useful in a number of ways: (1) to determine previous or current power or energy consumption of the domain to understand what power or energy consumption is likely to be needed in the near future (consumption prediction based on empirical consumption); and (2) determine when the consumption reaches a level that some action is to be taken to avoid exceeding a given power limit (when performance and/or power throttling is to be performed to avoid exceeding the power limit).

In one embodiment, power or energy consumption of a power domain during a control period is estimated based on activity in the domain over the control period. For example, in a memory power domain, each transaction issued to a memory device in a memory domain may be associated with some estimated, quantitative power/energy consumption. Therefore, by tracking the number of transactions issued to the memory devices over the control period, the number of transactions are combined with the quantitative power consumption to obtain a per memory device and/or an entire memory domain consumption. As can be inferred from the transaction example in a memory power domain, any event(s) within a power domain that could contribute to power consumption may be tracked and estimated in a similar manner.

In another embodiment, a power related measurement is performed in the power domain to determine measured power consumption for the domain. Continuing the example from above, current at a voltage supply and/or regulator for the memory power domain is measured/determined. In one scenario, current is represented by digital voltage identifier (VID) bits that are interpreted by the power related measurement. In yet another embodiment, a hybrid or combination of estimation and measurement is utilized to more accurately describe the power consumption of a power domain. Here, energy consumption is estimated based on events/activity and energy consumption is also measured for the power domain. And an algorithm is utilized to determine a total energy consumption based both on the estimated and measured energy consumption. Note that the estimated energy assumptions may be further tuned (or refined) based on a comparison of the measured and estimated energy.

Once the energy consumed for a control period is determined (either from estimation, measurement, or a combination thereof), then a comparison of that consumption with a power limit is performed. In other words, it's determined for a current control period how much headroom is available between the power consumed during the current control period and the specified power limit. Note the power limit may be provided over a time window that is different from a control period, such that the power limit is translated or interpolated for the control period. Then, an energy budget for a next (or current) control period is calculated.

In one embodiment, a budget for the entire domain is determined. As another example, whether a budget for an entire domain is calculated or not, the budget is intelligently allocated across the individual devices of the domain based on the previous consumption. For example, if one device is performing most of the work, a generic and even distribution of the power budget across each device potentially limits performance of the devices working harder. And if another device is not working hard, then its power budget is inefficiently squandered. However, if the power from the low consumptions devices is reallocated to the high consumption device, then the power is more efficiently distributed. As one example, whether a devices is high or low consumption is determined by how long it's throttled (i.e. high consumption the longer it is throttled). And when the power distribution between devices (including potential uneven distribution) is taken as a whole, the power is allocated to meet the power limit, while maximizing the performance of each device and the domain under the constraints of the power limit.

Moreover, in one embodiment, if consumption ends up below the power limit for a control period, then power credit may be accumulated and later spent when a consumption amount over the limit is required by the power domain. In other words, when control periods of consumption are smaller than a time window of a power limit, meeting the power limit is not specifically constrained to each control period. But rather, meeting the constraint is primarily focused on the average of the consumption over the control periods within the time window. This type of average over periods to meet a power limit for a time window is referred to herein as a Running Average Power Limit (RAPL). As a result, if activity is low in one period (i.e. the power consumption is below a determined limit for that period), then the 'left over' power headroom may be utilized to exceed (dynamically increase) a limit for a subsequent period. As can be seen from this example, utilizing RAPL for a power domain potentially enables adaptive power limiting to support bursty workloads, such as graphics workloads, that may be high in one period and low in another.

When a budget for a device in a power domain is determined (e.g. based on consumption and a power limit for the power domain), then any known method of limiting that device to that budget may be utilized. As a simplified example, a power supply for the specific device is limited. In another embodiment, the events that contribute to the consumption (i.e. the events that were tracked or caused the events to be tracked), are limited. Here, an energy budget for each device is converted into a performance metric limit. In other words, the performance of a device that corresponds to the power consumption of the device is limited to ensure the power limit is met. For example, in a memory power domain, memory devices perform actions (i.e. consume power) based on requests to the memory. As a result, an energy budget for a device is translated into a maximum number of requests (herein sometimes referred to as transactions) for a control period. During that control period, if a number of transactions to be scheduled and sent to the memory reach the threshold, then the transactions are throttled. And as a corollary, when the transactions are throttled, the power consumption is similarly throttled to ensure the power limit is not exceeded, unless previous power credits are being utilized.

When transactions are throttled, in one embodiment, the throttling is tracked (i.e. the number of transactions throttled or the amount of time/cycles transactions are throttled for is determined). This information may be used to estimate an extant or performance impact, which potentially enables more accurate dynamic decision for allocating power/energy budget under a power limit to maximize performance. However, such decisions in some embodiments, utilize information about the power domain and devices therein. Therefore, power components or other platform components, such as a Basic Input/Output Software (BIOS) interface, potentially determines such information and exposes it to the power interface for its decision making.

Figure 2:
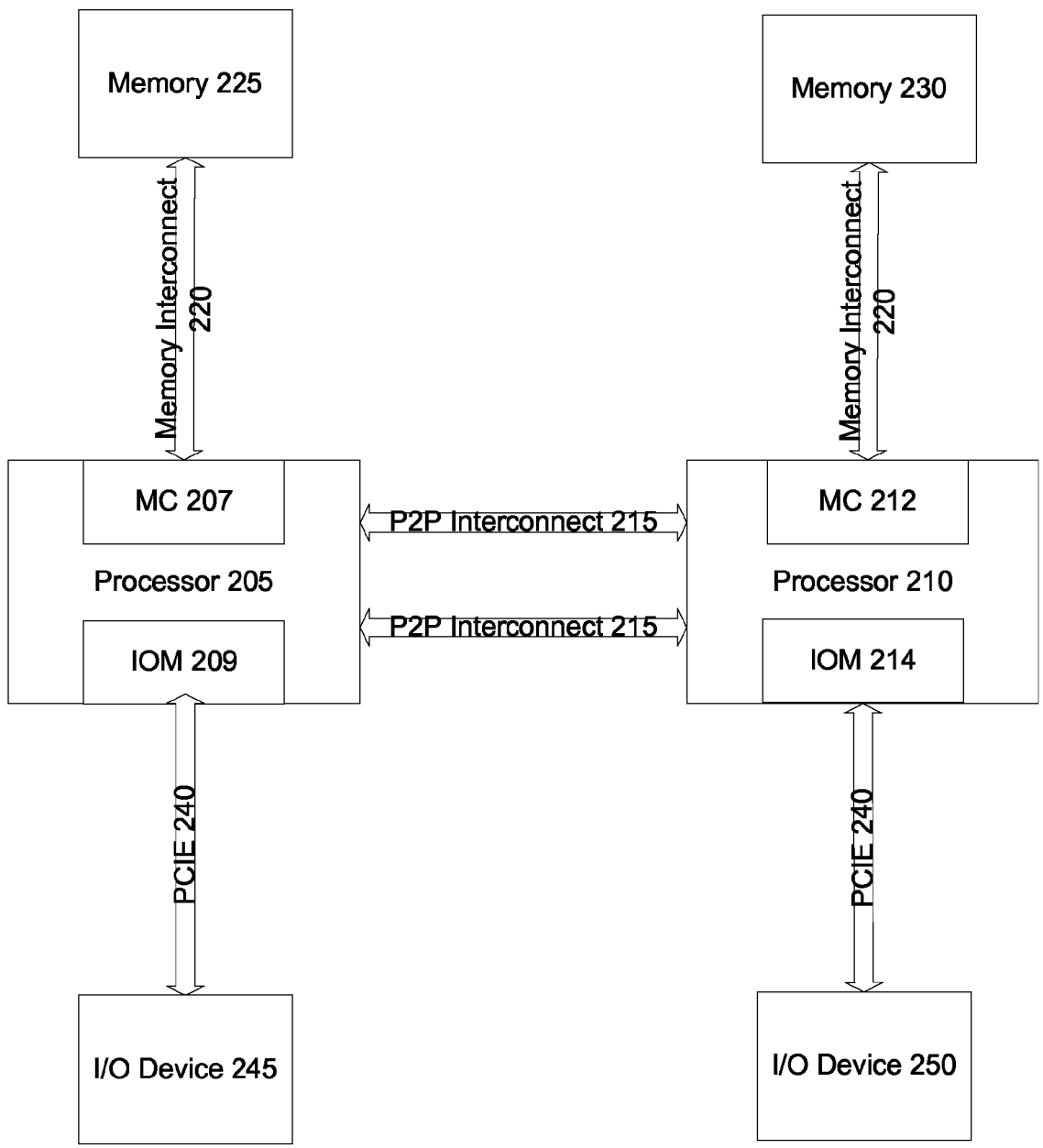
FIG. 2 illustrates an embodiment of a logical representation of a computer system configuration.
Figure 3:
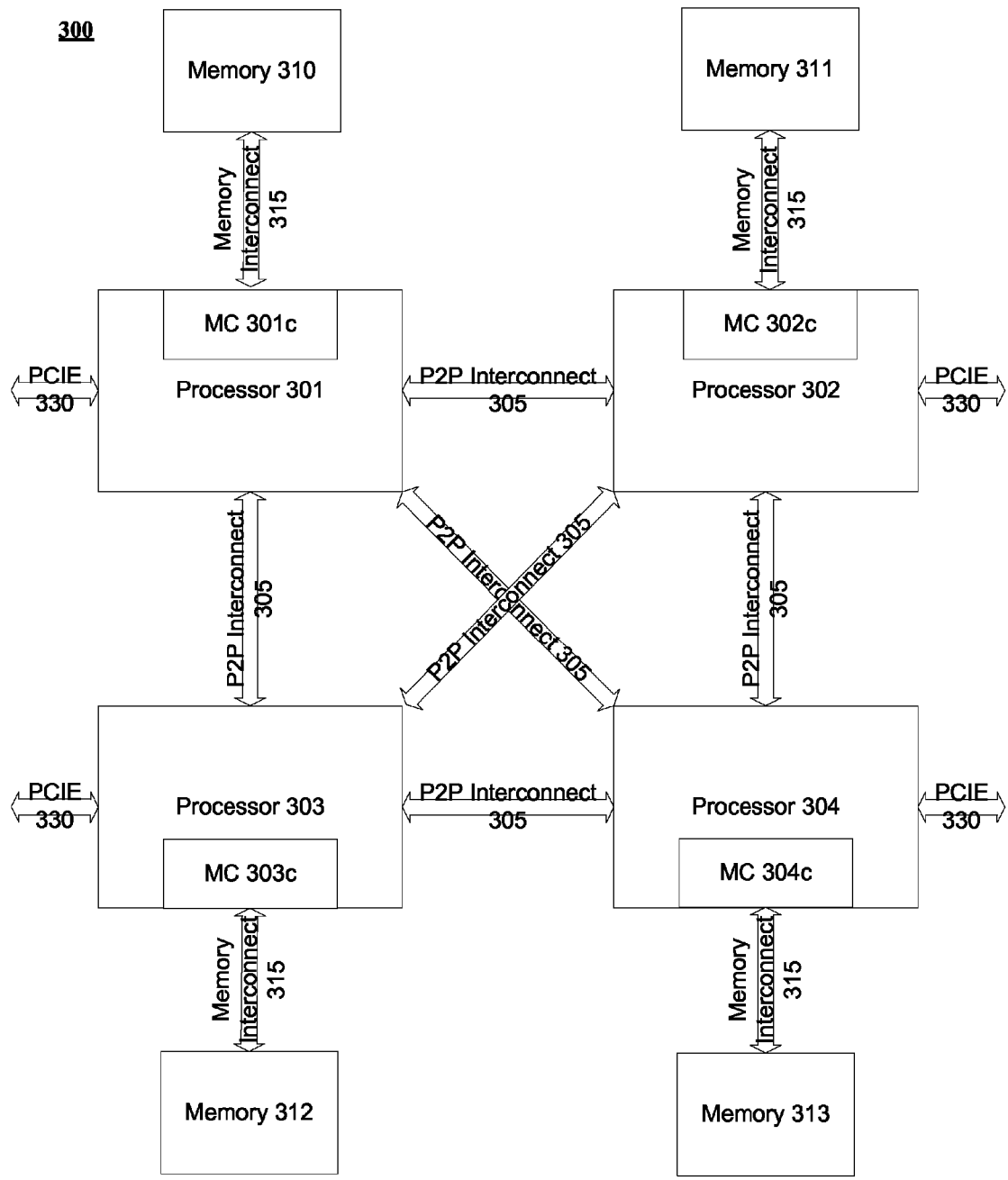
FIG. 3 illustrates another embodiment of a logical representation of a computer system configuration.
Figure 4:
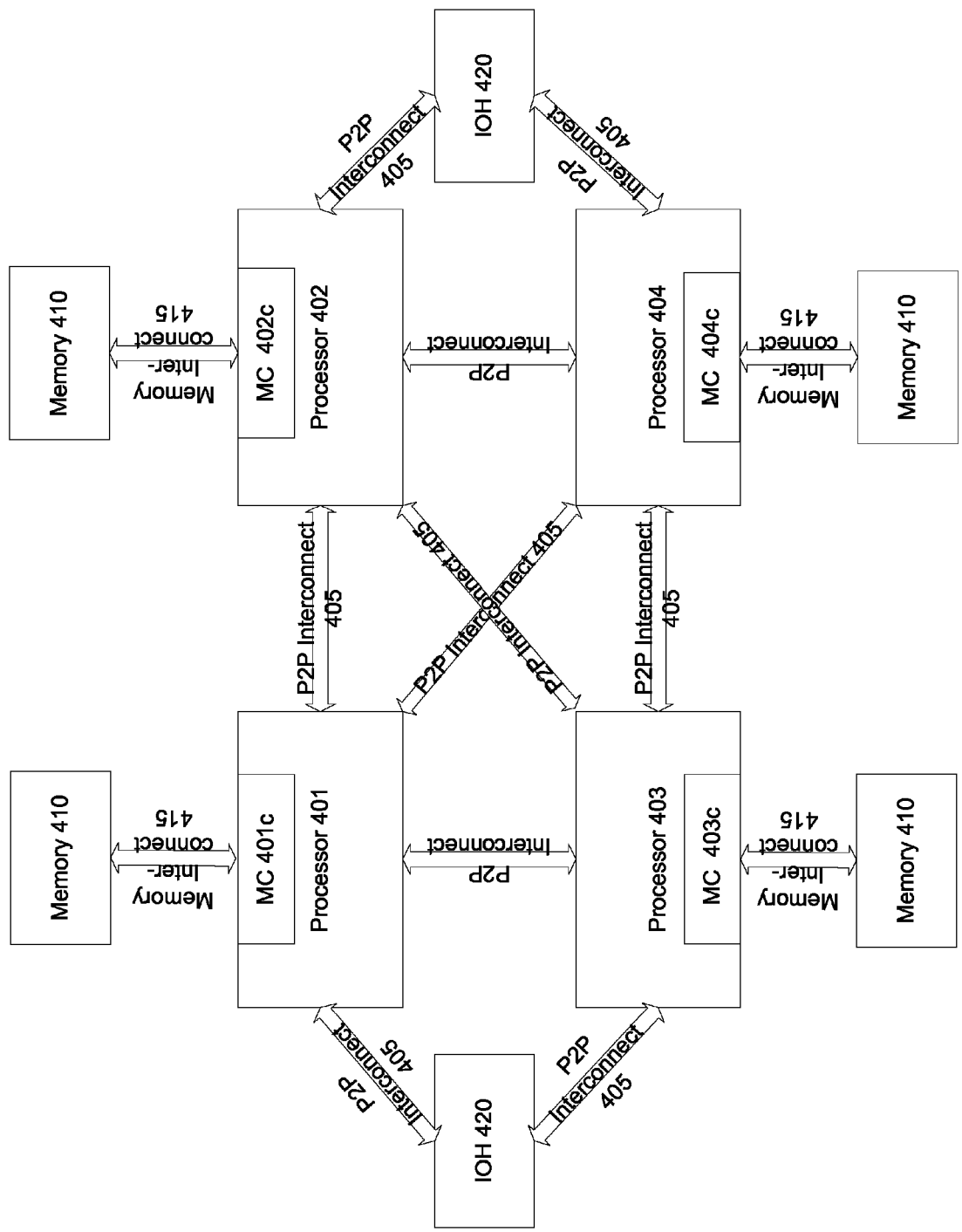
FIG. 4 illustrates another embodiment of a logical representation of a computer system configuration.

Referring to FIGS. 2-4, embodiments of a computer system configuration adapted to dynamically control one or more power domains is illustrated. In reference to FIG. 2, an illustrative example of a two processor system 200 with an integrated memory controller and Input/Output (I/O) controller in each processor 205, 210 is illustrated. A few of the possible domains as illustrated include one or more memory domains (e.g. all memory modules 225, such as DIMMs, coupled to memory controller 207 may be viewed as one memory power domain, while memory modules 230 coupled to memory controller 212 may be viewed as another memory power domain). Alternatively, all memory 225, 230 in system 200 in another implementation is considered a power domain. Power domains may similarly be viewed regarding Input/Output (I/O) devices 245, 250 (i.e. an I/O power domain for all I/O devices coupled to controller 209, 210, or both). In a like manner, processor 205; processor 210; processing elements of processor 205, 210; or a combination thereof may be viewed as one or more power domains.

Although not discussed in detail to avoid obscuring the discussion, platform 200 illustrates multiple interconnects to transfer information between components. For example, point-to-point (P2P) interconnect 215, in one embodiment, includes a serial P2P bi-directional cache coherent bus with a layered protocol architecture that enables high-speed data transfer. Moreover, a commonly known interface (Peripheral Component Interconnect Express, PCIE) is utilized for interface 240 between I/O devices 245, 250. Therefore, as can be seen any known interconnect or interface may be utilized to communicate to or within a power domain. Regardless of the type of interconnect, when throttling, such as transaction throttling, is to be performed, then the interconnect architecture is adapted to carry out such throttling. Note that transaction throttling is discussed in more detail below.

Turning to FIG. 3 a quad processor platform 300 is illustrated. As in FIG. 2, processors 301-304 are coupled to each other through a high-speed P2P interconnect 305. And each of the possible power domains from above may also be applied to platform 300. As a first example, platform 300 includes four memory power domains; one for all memory devices coupled to a memory controller. However, devices (whether they are of the same or different types) may be grouped into power domains in any manner. For example, they may be grouped based on how a power delivery network is configured. Here, if a voltage regulator supplies current to memory 310-313 and I/O devices, then all of those devices may be considered within a single power domain. And even though the discussion below often focuses on a single memory power domain, the techniques and apparatus described herein may be utilized across any known power domain.

FIG. 4 depicts another quad core processor platform 400 with a different configuration. Here, instead of utilizing an on-processor I/O controller to communicate with I/O devices over an I/O interface, such as a PCI-E interface, the P2P interconnect is utilized to couple the processors and I/O controller hubs 420. Hubs 420 then in turn communicate with I/O devices over a PCIE-like interface.

Figure 5:
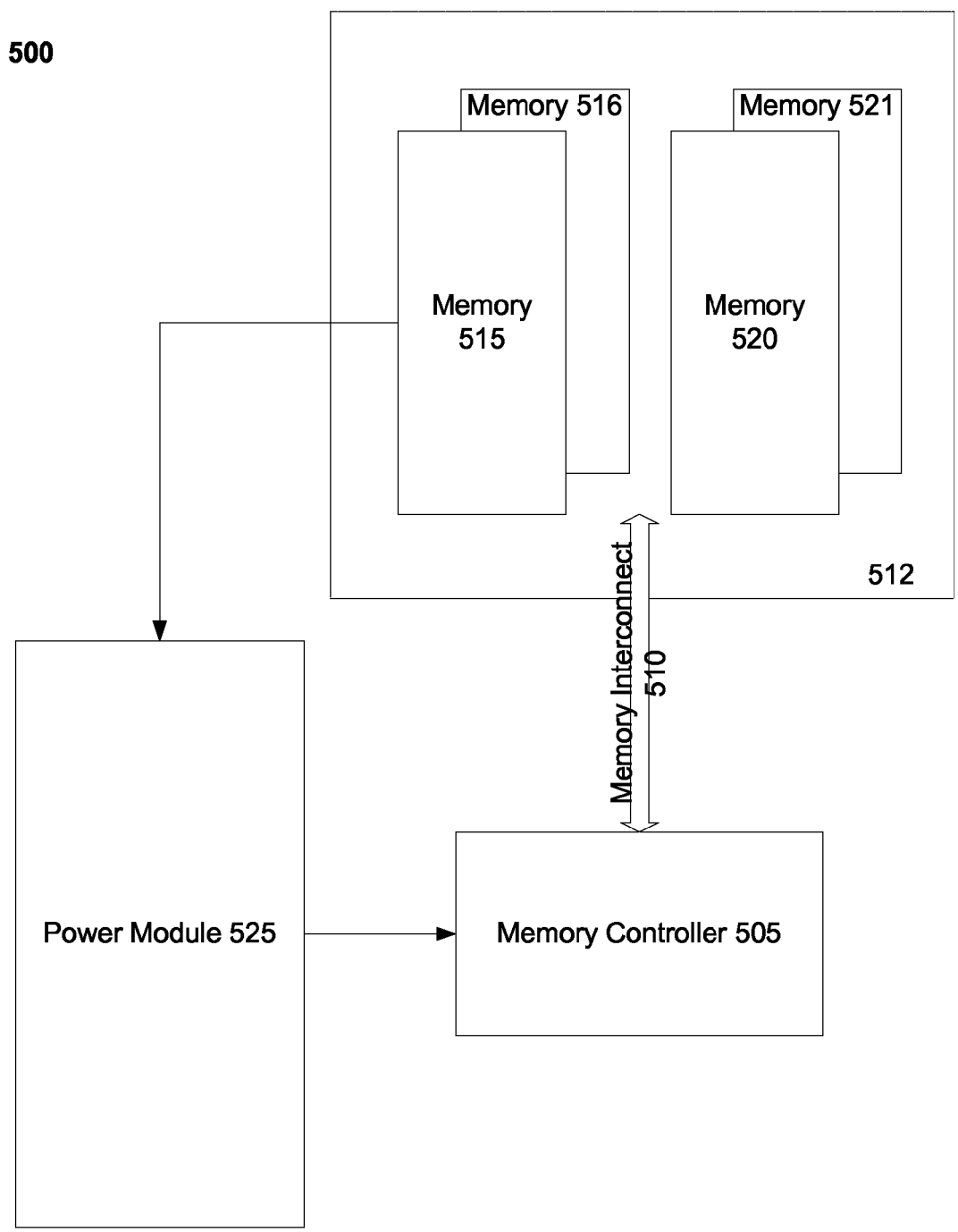
FIG. 5 illustrates an embodiment of a logical representation of power module to dynamically and efficiently enforce a power limit for a memory domain.

Referring next to FIG. 5, an embodiment of a logical representation of power module to dynamically and efficiently enforce a power limit for a memory domain is illustrated. Although the description of FIG. 5 is discussed in reference to a memory power domain 512, performance throttling may be similarly applied in any power domain. As depicted platform 500 includes memory devices 515, 516, 520, and 521 coupled to a memory controller 505, such as a controller integrated in a processor as illustrated in FIGS. 2-4. As a result, in one embodiment, memory devices 515, 516, 520, and 521 are referred to as being within or associated with memory power domain 512. Here, memory device 515 and 516 are in one channel of memory and devices 520, 521 are in a second channel. Note that memory devices 515, 516, 520, and 521 may include any known memory device (volatile or non-volatile); the most common example being a Random Access Memory (RAM), such as a Dynamic RAM (DRAM), Dual-inline Memory Module (DIMM).

During normal operation, memory controller 505 receives requests intended for memory devices 515, 516, 520, and 521, schedules the requests, and then issues the requests to the corresponding memory devices. Under a traditional line of thinking, these tasks were to be performed as fast as possible with no consideration of power consumption to ensure the highest level of performance throughput. However, in one embodiment, power module 525 is adapted to determine a maximum number of transactions for a memory device of the plurality of memory devices over a first amount of time based on a representation of energy consumption of the memory power domain in relation to a power limit for the memory power domain for a second amount of time.

Here, a power limit is supplied for memory power domain 512 over a time window (i.e. over the second amount of time). As a direct approach, power module 525 determines a maximum number of transactions that can be issued over the time window and meet the power limit/constraint. Yet, when the time window is a large time frame that is not conducive to the time scale for periods of issuing transactions, the time window may be split into smaller quantum's of time for limiting transactions.

As a result, when a number of transactions for any period of time reaches a maximum determined number, then memory controller 505 throttles (stops or slows scheduling and/or issuing) the transactions until the next period of time. Here, memory domain 512 is allowed to operate at full performance until a power limit is encountered; at which time performance throttling is started in an attempt to meet a power budget. However, limiting transactions to an entire power domain purely based on a power limit may not be the most efficient manner to maximize performance within a power constraint.

Consequently, in one embodiment, a power limit is intelligently divvied up between devices in memory domain 512 to fairly maximize performance within the power budget. In this example, energy consumption (power consumption over time) of domain 512 is determined. And based on the energy consumption, the energy budget (power budget over time) is determined for each of devices 515, 516, 520, and 521. In other words, if memory device 515 is handling more transactions (i.e. has a higher energy consumption), then device 515 may be allocated more of the energy budget during the next quantum of time. Using this example, it can be seen how purely equal allocation of an energy budget among devices may not maximize performance. Specifically, if device 515 is doing more work than device 520, then an equal allocation of energy budget may leave energy on the table for device 520, which device 515 may have been able to used instead of being throttled. Therefore, during the energy budgeting process, an energy budget is based on the previous consumption to provide device 515 with more budget than device 520. As a result, device 514 is allowed to perform at a higher-level than device 520. But at that time, device 515 may have needed more power. However, during subsequent time periods, if device 520 is utilizing more power, then the dynamic nature balances the power during that period to maximize performance for device 520.

A further illustrative embodiment of power module 525 being adapted to determine a maximum number of transactions for memory device 515 over a first amount of time based on a representation of energy consumption of the memory power domain 512 in relation to a power limit for the memory power domain 512 for a second amount of time is now discussed. Power module 525, in this example, includes an energy meter module adapted to determine the representation of energy consumption of the memory power domain 512 for a control loop period (a period of time for tracking events and/or determining an energy budget). As mentioned above, the energy module may perform an estimate of power consumption based on measured events associated with memory domain 512 over the control period, a power measurement associated with memory domain 512 over the control period, or a combination thereof.

And a power budget module determines an energy limit for the control period from a power limit for a time window. For example, a power limit for a time window is provided for memory domain 512. And that power limit is translated into a power/energy budget for a smaller amount of time (a control loop period). As an example, assume there are ten control periods in one time window for a power limit. In one embodiment, an equal budget is distributed over the ten control periods to stay within the power limit for the time window. In another embodiment, a running average is utilized. Here, a portion of the budget is allocated to a first control period. And if the entire budget is not utilized (consumed as determined by the energy meter from above), then a credit is accumulated. Subsequent control periods may then be allocated more energy budget based on the credit. As a result, the running average over the ten control periods meets the power limit for the time window. However, when the workload is more intense, more budget is potentially allocated to accommodate bursty workloads.

Note the discussion above indicated that a determined energy budget for a single control period may be allocated among devices 515 evenly or in a manner to maximize performance in memory domain 512. In one embodiment, to maximize performance, the power budget module intelligently allocates an energy budget for domain 512 over a control period between the devices 515, 516, 520, and 521 (i.e. an energy budget per memory device of memory devices 515, 516, 520, and 521). As an example, such allocation is based on the representation of energy consumption of memory power domain 512 for the control loop period in comparison to the representation of the power limit for the memory domain for the control loop period.

And based on that energy budget for each device of memory devices 515, 516, 520, and 521; a performance module determines a maximum number of transactions for each device of memory devices 515, 516, 520, and 521 over a controller time frame. As above, the controller time frame may be the same duration as a control loop for energy budgeting or a time window for a power limit. Yet, in another embodiment, a controller time frame is a smaller duration of time that is on a scale closer associated with operation of a high-speed controller, such as controller 505.

For example, assume device 515 had the highest energy consumption over the current control period. Based on the power limit over the time window and energy consumption for the current control period, an energy budget for device 515 is determined for the next control period. Here, the energy budget for device 515 is likely the highest energy budget based on its previous consumption. In other words, because device 515's workload was high, it's predicted that it will be high again in the current/next control period. The performance module, utilizing characteristics of device 515 and associated assumptions, translating the energy budget into a maximum number of transactions for memory device 515 during the next control period. During operation, the number of transactions scheduled and issued to memory device 515 is tracked. And if the number of transactions reaches the maximum, then controller 505 throttles (queues, slows or omits scheduling, slows or stops issuing) transactions to memory device 515 for the remainder of the control period. From another perspective, the performance that causes further energy consumption is throttled once the performance threshold is met.

In one embodiment, power module 525 (and the other modules described as included therein above) includes hardware and/or a combination of hardware and code. For example, power module 525 includes an integrated circuit including a non-transitory storage medium including power code and a micro-controller configured to execute the power code to perform the operations described above. Furthermore, power module 525, in this example, includes hardware or logic to track events (e.g. accesses or other performance/power events) and/or to measure current (power-related measurement) at a voltage source for domain 512.

Figure 6:
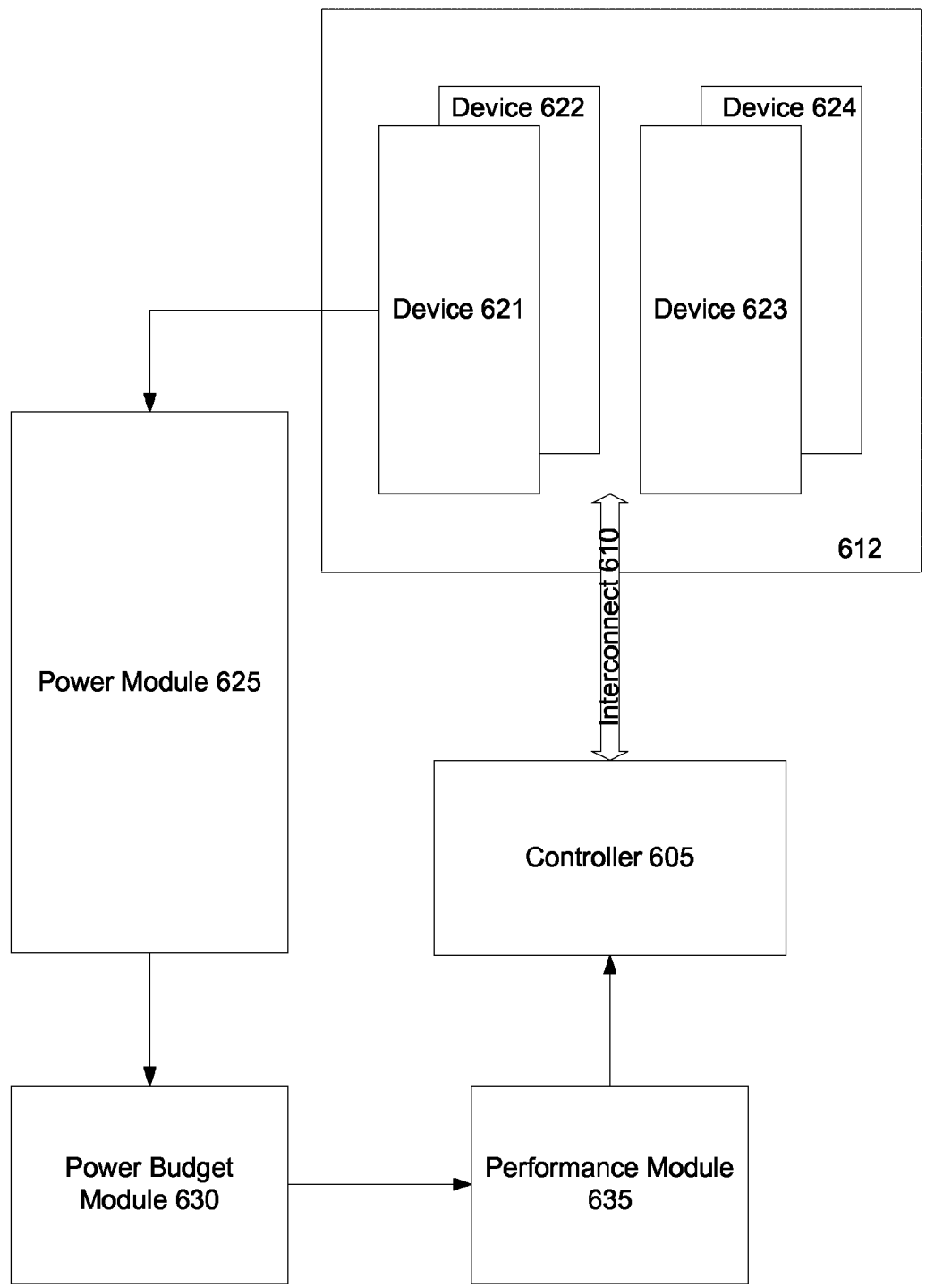
FIG. 6 illustrates an embodiment of a logical representation of power module to dynamically and efficiently enforce a power limit for a power domain.

Flipping to FIG. 6, an embodiment of a logical representation of power module to dynamically and efficiently enforce a power limit for a power domain is illustrated. The embodiments of dynamic power limit methodology described above in reference to FIG. 5 may be similarly applied to any power domain, such as a graphics power domain, a processor power domain, an Input/Output (I/O) domain, or any other possible grouping of known computing components/devices.

Here, domain 612 includes devices 621-624, which are coupled to controller 605 through interconnect 610. Power module 625 is to determine an energy budget for a next control period for each of devices 621-624 based on energy consumption of devices 621-624 over a current control period (or previous control period from the perspective of the next control period) and a power limit for the plurality of memory devices over a time window. As stated above, a time window may be larger than a control period for energy consumption determination and budgeting. For example, a time window is within a range of 1 millisecond to 100 seconds. As another example, the time window is within a range of 250 ms to 40 seconds. However, a time window may comprise any range included within the ranges mentioned above.

In one embodiment, power module 625 is to determine the energy consumption of devices 621-624 over a current (or previous) control period (i.e. a current control period for measurement that generates information to be utilized for budgeting over a next period) based on a representation of current at a voltage regulator associated with domain 612 over the current control period. As an example, a control period is 1 ms (e.g. 250 control periods in a 250 ms time window). However, the range of a control period may be in the microseconds to seconds (e.g. 200 microseconds to 200 milliseconds).

In this scenario, module 625 is to convert the power limit for power domain 612 over the time window to an energy limit for domain 612 over the current control period, and to determine the energy budget for the next control period for each of devices 621-624 based on the energy consumption of devices 621-624 over the current control period in comparison to the energy budget for devices 621-624 over the current control period.

Once the energy budget for each device of devices 621-624 is determined, then performance budget module 630 determines a maximum performance metric over the next/current control period for each of devices 621-624. In other words, power module 625 determines an energy consumption for domain 612 and/or device 621. Then, either power budget module 630, power module 625, or a combination thereof, determines the energy budget for device 621. And performance module 635 translates that energy budget into an actionable power limiting action (a maximum performance metric). In one embodiment, performance module 635 converts the energy budget (or the performance metric over the control period) to a performance metric over a performance period. Much like above, where the power limit time window is split into control periods, such that a running average of a power limit is spread across a larger time window, a control period, in this example, is split into smaller performance periods. In other words, dynamic control of power consumption is potentially more efficient in smaller control periods and performance limiting for high-speed devices is also potentially more efficient in even smaller increments. As a result, the range of a performance period may stretch from nanoseconds through microseconds to milliseconds. As a specific illustrative example, a power limit time window is 250 milliseconds, the control periods are 1 millisecond (i.e. 250 control periods per time window), and the performance periods are 1 microsecond (i.e. 1000 performance periods per control period).

Controller 605 limits the performance metric for each of devices 621-624 to the maximum performance metric over a performance period. Note that the maximum performance metric for a control period may be split evenly over the performance periods or distributed as a running average (i.e. provided a maximum in a performance period, and when that maximum is not met the credit is able to be spent in later performance periods). Continuing the example from above, assume domain 612 includes a memory domain and there is a limit of one million transactions to be issued to device 621 over a 1 millisecond control period. As a result, controller 605 may schedule and issue a maximum of 10 transactions per microsecond performance period. And if only 8 transactions are scheduled during a single performance period, then a subsequent performance period may schedule as many as 12 transactions in that microsecond (i.e. the original 10 plus the 2 credit from the previous performance period). Consequently, at the end of the control period, assuming the translation of a performance metric to energy consumption is accurate, then by limiting/throttling the transactions the energy budget for that control period should be met. Furthermore, if the running average between control periods is restricted to the overall power limit for a time window, then a provided power limit is met, while maximizing performance therein.

Although a memory power domain and associated performance metrics, such as memory transactions, has been primarily discussed herein, any power domain or performance metric may be similarly dynamically controlled. For example, in a domain or processors (or processing elements on a processor), a similar energy budget per processing element is determined based on a power limit and energy consumption. And that budget is translated into an actionable performance limit. For example, in a processor it may include throttling instruction fetch, issuance, scheduling, or execution, as well as any other known method for throttling performance or power (e.g. energy limit bandwidth limit, etc). This also would be applicable in a graphics domain, where a graphics device(s) is throttled (either by instruction or graphics bus transactions) according to a running average power limit. As yet another example, an I/O power domain may also be dynamically controlled. Here, a power budget is translated into an energy budget for each I/O device, such as a network controller. And if the network controller encounters a maximum performance metric, such as packets scheduled or issued over a network, then packet issuance/scheduling is similarly throttled. As can be seen, the running average power limit methodology may be implemented in any power domain, not just a memory power domain.

Figure 7:
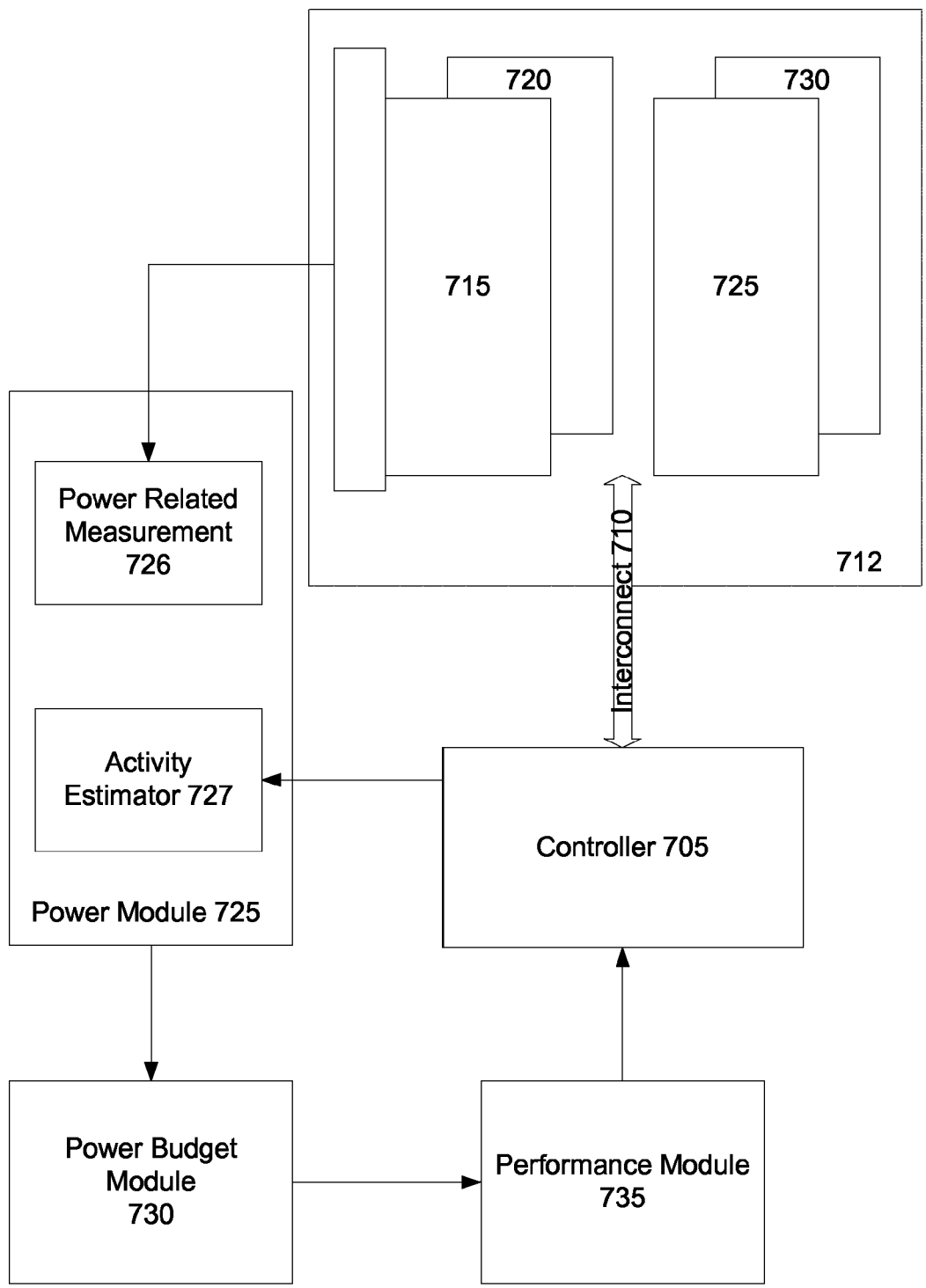
FIG. 7 illustrates another embodiment of a logical representation of power module to dynamically and efficiently enforce a power limit for a power domain.

Now FIG. 7 illustrates another embodiment of a logical representation of power module to dynamically and efficiently enforce a power limit for a power domain. In one embodiment, at least some of the modules described in reference to FIG. 7 are implemented in a power control unit (PCU). Although a power control unit may be implemented solely in hardware or software. Often a power control unit includes a micro-controller to execute power code collocated on a non-transitory medium; the power code when executed to perform operations discussed herein.

Devices 715, 720, 725, and 730 are included in (associated with) power domain 712 (i.e. coupled to controller 705). Here, a power meter module 725 determines a representation of power consumption of the plurality of devices. In one embodiment, the representation of power consumption is based on a current measurement at a voltage regulator for domain 712 (or devices therein) by power related measurement module 726. As an example, the representation of power consumption of the plurality of devices includes a representation of energy consumption (i.e. power consumption over an amount of time, such as a control period).

In another embodiment, the energy consumption of power domain 712 (and/or individual devices therein) is determined by activity estimator module 727 based on an estimation of energy consumption from activity within domain 712. As a combination, an energy measurement module, such as power module 725, determines an amount of measured energy consumed by domain 712 over a current control period. For example, the power code for power module 725 is executed at least once very control period to perform appropriate energy consumption calculations. Note that the description has commonly referred to a previous, current, and next control period. However, use of these terms may overlap each other in some instances. For example, if the energy determinations and budgeting are made at the end of each control period, then often the budget is utilized or applied in a 'next' or 'current' control loop based on the temporal perspective (i.e. if one is observing the energy calculations at the end of a period, then the budget determined is for the next even though calculations are being made in the current period). Furthermore, the calculations may be made at the beginning of a control period. Here, the energy consumption determinations are being made regarding a 'previous' control period to calculate budget and throttle in a 'current' period.

In one scenario, energy meter module 725 determines the energy consumption of devices 715, 720, 725, and 730 over the current control period based on a combination of the estimated energy consumption from activity estimator 727 and the amount measured energy consumed as measured by power related measurement module 726. Activity energy estimate module 727 includes energy estimate code of the power code, when executed by the micro-controller, to cause the micro-controller to determine the estimated energy consumption for devices 715, 720, 725, and 730 over the current control period based on the activity of the plurality of devices over the previous control period. Here, the power code, when executed, may poll tracking hardware, such as counters to track activity in power domain 712. And based on that activity, estimator module 727, using assumptions and/or characteristics of devices 715, 720, 725, and 730, estimates the energy consumed over a control period.

Similarly, power related measurement module 726 is able to read/poll voltage identification bits (VID bits) for a voltage regulator associated with domain 712. And an energy measurement is determined based on the change in current/voltage over the control period. The power code, when executed, may then utilize an algorithm to combine the estimated energy consumption and the measured energy consumption over the current control period.

Power budget module 730 determines a representation of a power budget, such as an energy budget, for each device, such as device 715, of domain 712 based on the representation of power consumption (energy consumption) for the domain 712 and devices therein. In one embodiment, power budget module 730 includes a power cap module and a device budget module. The power cap module determines an energy budget for devices 715, 720,725, and 730 for the next control period based on the representation of energy consumption of the devices 715, 720,725, and 730 over the current control period in relation to the power limit for the power domain over a time window. The device budget module determines the representation of the energy budget for each individual device, such as device 715, over the next control period based on the energy budget for all of devices 715, 720, 725, and 730 for the next control period.

Performance module 735 determines a maximum performance metric for each individual device within domain 712, such as device 715, based on the representation of the power budget for the device. For example, the performance metric includes a maximum number of transactions to be scheduled for, issued to, and/or transmitted to a device, such as device 715 over the next control period. In this example, a performance limiter module determines the maximum number of transactions to be associated with device 715 over the next control period (or over a performance period within the next control period) based on the representation of the energy budget for device 715 over the next control period and a scale factor associated with a power versus bandwidth characteristic of device 715. As discussed in more detail below, information utilized by the power-related modules may be exposed thereto by different hardware/modules in the system. For example, BIOS potentially determines from tables or dynamic testing domain 712's characteristics. And then exposes those characteristics, such as the scale factor, to the power interface. Note that the power limit and time window, in one embodiment, is similarly exposed to the power interface from a power unit or platform power manager.

Once a maximum performance metric, such as a maximum number of transactions, for device 715 is determined, then controller 705 limits a number of transactions intended for device 715 to the maximum number of transactions over the next control period (or the performance period within the next control period). Essentially, controller 705 includes hardware, logic, and/or firmware to enforce the budget for device 715, which is translated into a form of a performance metric.

Figure 8:
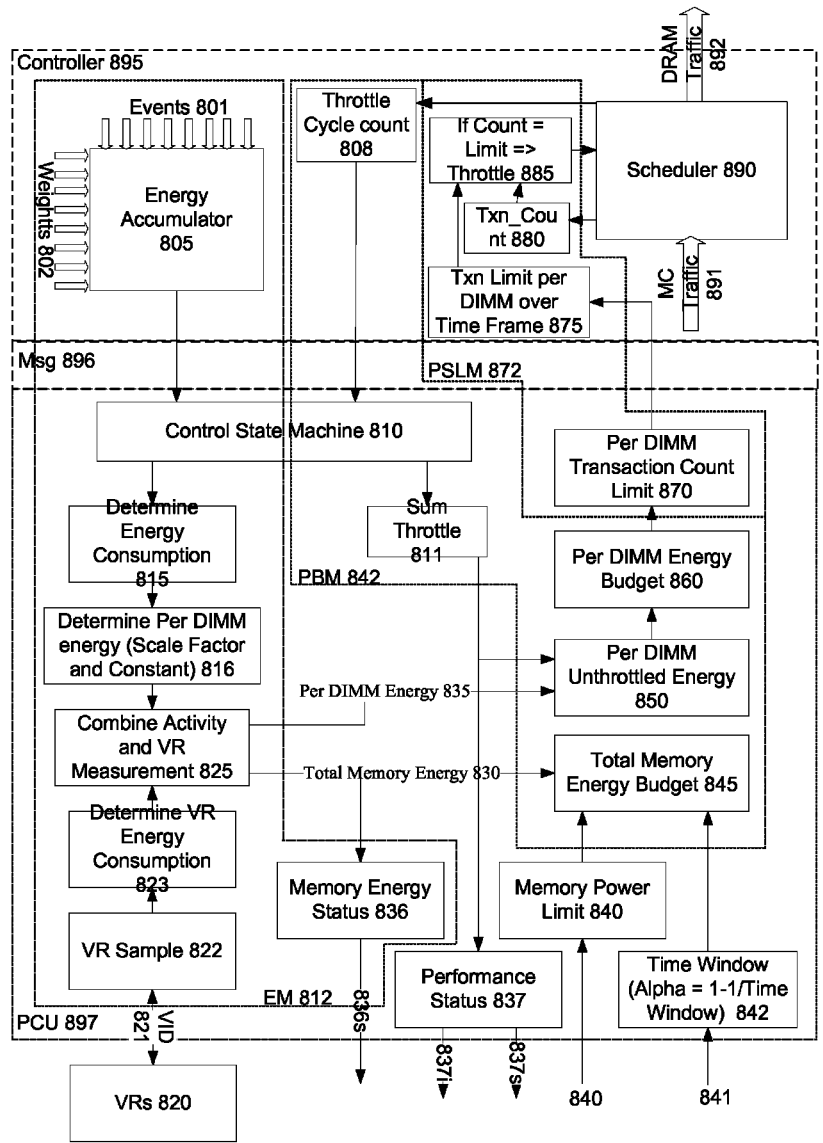
FIG. 8 illustrates an embodiment of a flow diagram for dynamically and efficiently enforcing a power limit for a power domain.

Moving to FIG. 8, an embodiment of modules and/or a representation of a flow diagram for a method of dynamically controlling a power domain utilizing a running average power limit is shown. Note that the flows (or modules) are illustrated in a substantially serial fashion. However, both the serial nature of these flows, as well as the depicted order, is not required. For example, in reference to FIG. 8, based on the design implementation, flows 815, 816 and 825 may not be performed if a design relies purely on power measurements to determine energy consumption. Also, flows 815-825 are illustrated in a substantially linear or serial fashion. However, the flows may be performed in parallel over the same time period. In addition, any of the illustrated flows or logical blocks may be performed within hardware, software, firmware, or a combination thereof. As stated above and below, each flow, in one embodiment, represents a module, portion of a module, or overlap of modules. Moreover, any program code in the form of one or more instructions or operations, when executed, may cause a machine to perform the flows illustrated and described below. Note that the discussion below is primarily in reference to dynamic power control in a memory power domain; however, the flows similarly apply to any power domain, such as a collection of computing platforms (e.g. a server rack or data center with each server acting like a device in a power domain), an entire computing platform with one or more power domains, a graphics power domain, an I/O power domain, a processor power domain, etc.

In the illustrated embodiment, a dynamic running average power limit (RAPL) interface for a memory power domain is illustrated. In one embodiment, power limit 840 is supplied to the RAPL interface. Here, a platform power manager or other power related device provides a limit 840 for memory power over a time frame. For example, power is distributed to power domains within a computing platform to meet overall power requirements. So, when a notebook is detached from a wall power supply and is to consume less power, the platform policy manager may reduce the power limit 840 for the memory domain. Moreover, when performance is at a premium, the power limit 840 is increased.

As a result, power limit 840, in one embodiment, is supplied to the RAPL interface along with a time window 841 (i.e. an amount of time the power limit for the memory power domain is to be enforced over). An exemplary range for time window 841 includes 1 millisecond to 100 seconds or any range therein (e.g. 250 milliseconds to 40 seconds). And to implement the RAPL in this scenario, at least some of the modules described in reference to FIG. 8 are performed at least once every control period (a smaller increment of time than the time window to implement more fine-grained and better quality regulation to meet the power limit requirement 840 over time window 841). For example, a control period may be within the range of 100 microseconds to 200 milliseconds.

As illustrated, modules, such as energy meter 812, span multiple devices as well as firmware (power code in a power control unit). In one embodiment, energy meter 812 is to estimate energy consumed by the memory domain at least once every control period. In the illustrate scenario, a hybrid of memory controller based activity estimation and direct sampling of output current from a voltage regulator is utilized to estimate energy consumed. Energy meter module 812 generates total memory energy 830 and per memory device energy 835 (such as a DIMM), as well potentially per channel energy and other energy/power metrics. Total memory energy 830, in one example, is summed per control period to provide memory energy status 836. Moreover, per channel energy may be summed per control period as well.

Energy meter 812 includes activity counter per RANK (i.e. a smallest entity in a memory device), which indicates/track extant of energy usage per RANK. For example, energy accumulator 805 includes counters to track events 801 associated with activity in the memory domain. Note that counters may be sized based on control period size to ensure they do not wrap by an end of the control period. Moreover, firmware (e.g. BIOS and/or BIOS Extensible Firmware Interface {EFI}), provides weights 802 per memory device (i.e. scaling factors per memory device for events 801). Examples of events 801 include Column Address Strobe Write (CAS W), CAS Read (CAS R), Row Address Strobe (RAS), Precharge (PRE), Clock Enable (CKE), On Die Termination (ODT), REF memory, and Activity (ACT). Therefore, the scale of contribution of each of these events maybe normalized to determine the energy contribution of events 801. For example, equation 1 below represents an algorithm for determining energy activity per rank of a memory device.

$$EnergyActivityCount[Rank] = \quad \text{Equation 1}$$
$$\#REF*REF_{WEIGHT} + \#ACTACT_{WEIGHT} +$$
$$\#ODT*ODT\_WEIGHT + \#CKE*CKE\_WEIGHT +$$
$$\#PRE*PRE\_WEIGHT + \#CAS\_R*CAS\_R\_WEIGHT +$$
$$\#CAS\_W*CAS\_W\_WEIGHT$$
Energy Consumption Energy meter 812 further includes a power estimator module to determine energy per memory device 816 (i.e. converts the counts per RANK to energy per memory device). System firmware (e.g. BIOS), in one embodiment, configures and/or exposes a power scale factor and idle power value per memory device (i.e. characteristics of each memory device installed in the system either based on dynamic determination or information associated with the device type, brand, etc.). Here, power code in PCU 897 is executed (often by a PCU microcontroller) to poll values of the energy calculator/accumulator 805 per control period, such as through utilizing control state machine 810. Note that a counter may be reset every control period, while the delta between the start and end of a control period may be utilized in the case of an accumulator. As in flows 815 and 816, the exemplary equations 2-5 below convert such activity into an estimate of per memory device energy.

$$DeltaActivity[Rank] = ActivityCounterCurrent[RANK] - \quad \text{Equation 2}$$
$$ActivityCounterPrevious[RANK]$$
Change in Activity over a control period $$Delta\_Activity[DIMM] = \sum Delta\_Activity[Rank] \quad \text{Equation 3}$$
Sum of change of activity for each rank
in a memory device over a control period $$DeltaEstEnergy[DIMM] = \quad \text{Equation 4}$$
$$PwrScale\_Factor[DIMM]*DeltaActivity[DIMM] +$$
$$IdlePower[DIMM]*ControlLoopPeriod$$
Change in estimated energy for a memory device
based on activity over a control loop period As can be seen from embodiments of equations 2-4, energy may be estimated per memory device in flows 815 and 816 based on activity tracked in controller 895 by accumulator 805. Furthermore, in one embodiment, a power-related measurement is also performed. For example, a voltage regulator (VR) module determines a current out reading (VR sample 822) at voltage regulator (VR) 820. And that current out reading (e.g. VID bits at VR 820) is translated into measured energy consumption in flow 823. An example of equations to perform such a conversion is provided below in Equations 5-7. Note that during tuning (i.e. dynamically improving) a RAPL interface, this VR polling module for measuring current and determining energy may be utilized to characterize memory devices and improve accuracy of assumptions about memory power domains.

$$iOut[VR] = VRiOut[VR]$$
$$*ScaleFactor[DIMM] \quad \text{Equation 5: Current out reading for a VR}$$

$$DeltaMeasuredEnergy[VR] = iOut[VR]$$
$$*Vddr*ControlLoopPeriod \quad \text{Equation 6: Change in energy for a VR over a control loop period}$$

$$DeltaTotalMeasuredEnergy = \Sigma DeltaMeasuredEnergy$$
$$[VR] \quad \text{Equation 7: Sum of change in energy for all memory VRs over a control period}$$

Then, according to the hybrid approach mentioned above, a power meter module 825 combines the estimated energy and measured energy to provide the output (total memory energy 830, energy status 836, and per DIMM energy 835) of energy meter module 812. Embodiments of equations to perform such a combination is provided below in equations 8-12.

$$EnergyStatusAccumulated = \\ EnergyStatusPrevious + \sum DeltaMeasuredEnergy[VR]$$

Accumulated energy status

Equation 8

$$DeltaEstimatedEnergyVR[VR] = \\ \sum_{DIMMminaVR} Delta\_Est\_Energy\_DIMM[DIMM]$$

Change in estimated VR energy over a control period

Equation 9

$$DeltaEnergyDIMM[DIMM] = \\ \frac{DeltaEstEergy_{DIMM[DIMM]} * DeltaTotalMeasuredEnergy}{DeltaEstimatedEnergyVR[VR]}$$

Change in energy for a memory device over a control period

Equation 10

$$DeltaEnergyCH[CH] = \\ \sum_{DIMMminCH} DeltaEnergyDIMM[DIMM]$$

Change in energy for a memory channel over a control period

Equation 11

$$EnergyStatusAccumulated[CH] = \\ EnergyStatusPrevious[CH] + DeltaEnergyCH[CH]$$

Accumulated energy status for a channel of memory

Equation 12

Power budgeting module 842 takes memory power limit 840; time window 841/842; memory energy 830; per DIMM energy 835; and throttling information, such as throttle sum 811, and outputs an energy budget on a per DIMM (memory device) basis. In other words, power budget module 842 compares energy consumed in a control loop period with power limit 840 in regard to time window 841 and determines an amount of adjustment in power limiting action. For example, a moving average filter is implemented.

In one embodiment, power budgeting module 842 includes a cap module and a DIMM power budget module. The cap module is to determine a total memory energy budget from power limit 840 and time window 841 in flows 842, 845. Equations 13 and 14 included below illustrate an embodiment of determining energy budget headroom and a total memory budget as in flows 842 and 845.

$$Alpha = 1 - \frac{ControlLoopPeriod}{TimeWindow}$$

Equation 13

A remaining portion of a ratio of control loop period over a time window $$EnergyBudgetPeriod = \\ Alpha * EnergyBudgetPreviousPeriod + \\ (1 - Alpha) * (PowerLimit * ControlLoopPeriod) - \\ (1 - Alpha) * DeltaTotalMeasuredEnergy$$

Total energy budget for a current/next control period

Equation 14

The DIMM power budget module determines an energy budget per DIMM in flow 860 based on amount of time each DIMM is throttled in a previous period (as determined in flow 850). Here, power is re-budgeted among the DIMMs to minimize throttling under the power limit. Note that FIG. 8 illustrates one embodiment of obtaining an amount throttled. In the illustrated scenario, controller 895 counts cycles throttled in flow 808. And that count is sent to control state machine 810 in PCU 897 though message channel 896. The throttle cycles are summed in flow 811 and provided to per DIMM unthrottled energy flow 850. Equations 15-17 below illustrate an embodiment of determining an energy budget per DIMM based on the inputs described above including an amount of throttling for a previous period.

$$UnthrottledEnergyDIMM[DIM] = \\ DeltaEnergyDIMM[DIMM] * \\ \left(1 + \frac{ThrottledTimeDimm[DIMM]}{ControlLoopPeriod}\right)$$

Unthrottled Energy Per DIMM over a control period

Equation 15

$$SumUnthrottledEnergy = \\ \sum_{AllDIMMs} UnthrottledEnergyDIMM[DIMM]$$

Sum Unthrottled Energy over a control period

Equation 16

$$EnergyBudgetDIMM[DIMM] = EnergyBudgetPeriod * \\ \left(\frac{UnthrottledEnergyDIMM[DIMM]}{SumUnthrottledEnergy}\right)$$

Energy budget per DIMM over a control period

Equation 17

In one embodiment, performance state limiter module 872 takes the per memory device energy budget from flow 860, translates the budget into a per memory module transaction count limit 870, and throttles memory traffic to one or more DIMMs if the count limit is reached in flows 875-885. As one example, a transaction count limit for a memory device is generated in 870 based on the per DIMM energy budget 860 and a scale factor (a weight representative of the DIMMs power versus bandwidth, which may be determined/exposed by BIOS). The count limit from 870 is written through message channel 896 to controller 895. In one embodiment, a transaction limit for a time frame, which is smaller than a control period (e.g. in the range of nanoseconds to milliseconds) is determined in flow 875. In other words, a time frame for high-speed controller 895 is more intelligently determined to provide a more fine-grain and accurate time scale for performance throttling. When a transaction is scheduled (a transactions is allowed) to a specific DIMM with scheduler 890, transaction counter(s) 880 tracks such an event. And if the transaction count 880 reaches the limit in a time frame, then the transactions to the DIMM are throttled in flow 885. Therefore, some DIMMs may be throttled during a time frame for reaching their limits, while other DIMMs that have not reached their limit may still have transactions scheduled and issued. Examples of the equations to obtain maximum transactions per DIMM based on an energy budget are included below in equations 18-19. Note that the min and max power of each DIMM may be dynamically determined in each platform by characterizing the memory power domain, such as with BIOS or other modules.

$$Gain[DIMM] = \left(\frac{MaxTransPerControlPeriod}{MaxPowerDIMM[DIMM] = MinPowerDIMM[DIMM]}\right)$$

Equation 18

Gain per DIMM based on Max and Mim DIMM power $$Gain[DIMM] = EnergyBudgetDIMM * Gain[DIMM]$$

Equation 19

Max Transactions per DIMM based on Energy budget and Gain

Performance status module 837, in one embodiment, generates an indicator utilized to gauge an impact of power limiting on desired performance. For example, a total time for which transactions are not issued to memory due to hitting the maximum transaction limit is indicated. A running counter (accumulator), for each DIMM, increments every cycle that transactions are throttled and that accumulator value is output each control loop period. Examples of equations to be implemented in a performance module for providing such indications are illustrated below in equations 20-23.

$$DeltaThrottleCycles[DIMM] = \\ ThrottledCyclesCurr - ThrottledCyclesPrev$$

Change in throttled cycles over a control period $$ThrottledTimeDIMM[DIMM] = \frac{DeltaThrottleCycles[DIMM]}{MemoryFrequency}$$

Per DIMM amount of time throtteld $$AvgThrottledTime = \frac{ThrottledTimeDIMM[DIMM]}{NumDIMMsPresent}$$

Average throttled time $$AccumulatedStatus = \\ AccumulatedStatusPrevious + AvgThrottledTime$$

Accumulated performance status

Equation 20

Equation 21

Equation 22

Equation 23

Figure 9:
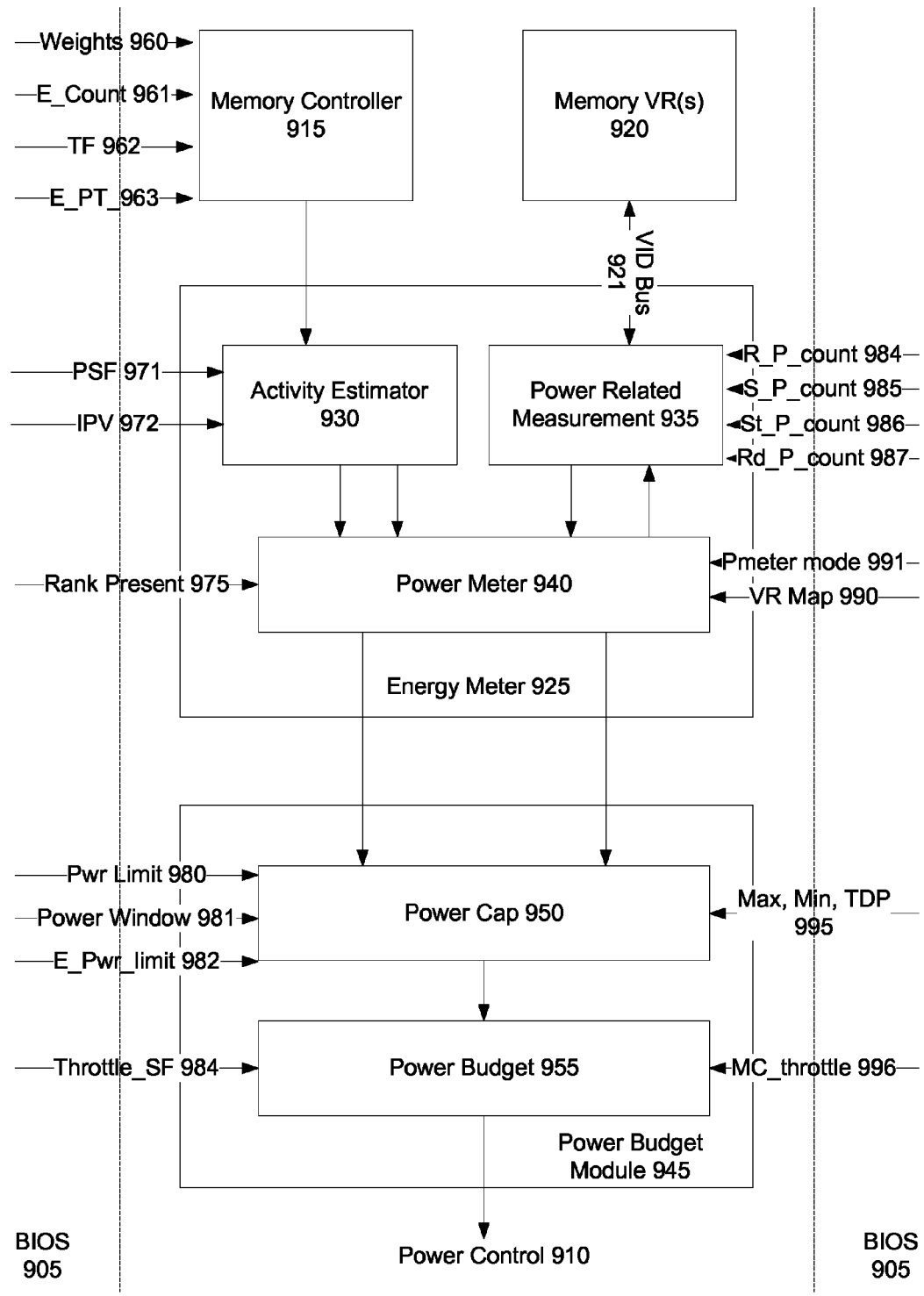
FIG. 9 illustrates an embodiment of a logical representation of exposing power related information to modules for dynamically and efficiently enforcing a power limit.

Referring next to FIG. 9, an embodiment of a firmware environment to provide information for a dynamic power control interface is illustrated. Commonly, Basic Input/Output Software (BIOS) is executed at power-on to initialize a platform and its components. Often, BIOS code is held on a non-transitory storage medium, such as a non-volatile memory (flash memory) to be executed at a reset or power-on event. However, BIOS-type software may also be executed during runtime. Typically, this type of BIOS execution is referred to as a firmware runtime interface, such as an Extensible Firmware Interface (EFI) to provide services at runtime. As a result, EFI and/or BIOS may perform tuning and updates to power domain supplied information during runtime.

In one embodiment, BIOS may initialize both memory, and in the process, the power control interface therefore. Or as mentioned above, after initialization BIOS may dynamically tune the power interface. For example, BIOS may determine (either dynamically through testing, patterns, etc. or statically through storage of previously collected/determined, such as stored 3 sigma tables) characteristics of the memory power domain that the power interface utilizes, as described above. Examples of such information that BIOS may determine and expose to the power interface include: weights per DIMM 960 for different event counts (e.g. Activity, Refresh, Precharge, CAS Read, CAS write, ODT, CKE, etc; enable event counter signal 961, power throttle time frame 962, enable power throttling signal 963, a power scale factor 971 per DIMM, idle power value 972 per DIMM, rank present vector (s) 975 informing of active DIMM slots, channel to VR mapping(s) 990, power meter mode 991, maximum/minimum Thermal Design Power (TDP) 995, gain per DIMM, throttle count 996, throttle scale factor 984 per DIMM, power counter control signals 984-987, power limit 980, power window 981, enable power limit 982, etc.

Although the information and/or signals have been described above in reference to being exposed by BIOS (or written by BIOS) to a power interface, such as to each of the illustrated modules (controller 915; energy meter 925 includes activity estimator 930, power related measurement 935; and power meter 940; and power budget module 945 including power cap module 950 and power budget module 955), any collection of this information may be omitted or provided by other interfaces, as well as by the power interface itself. For example, a power manager, such as a power controller, may assign power limit 980 and power window 981 instead of BIOS. Or the power interface may self-regulate power (i.e. assign its own power limit 980 and power window 981 based on current operating conditions). Moreover, information, such as throttle 996, in one example, is generated by the power interface during operation, while control signals 984-987 are manipulated by the power interface to read VID bits 921. Additionally, any module may run tests on the memory subsystem and log the maximum, minimum and TDP powers of the installed memory configuration.

Therefore, as can be seen from above, dynamic power control, such as a running average power limit for a power domain, potentially enables accurate power measurement at the memory domain, power/performance limiting on a per device granularity, faster control loop power capping to meet larger power limit time windows, intelligent budgeting of power among multiple devices to achieve maximum performance under a power limit, memory capping range determination, dynamic tuning of per device power estimation, and feedback/reporting of power and performance impacts from a power limit so a new power limit may be more intelligently selected. And as a result, the techniques described herein substantially and materially contribute to energy efficiency and power savings in computer systems.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a plurality of devices to be included in a power domain;
a power meter hardware module adapted to determine a representation of power consumption of the plurality of devices over a current control period based on a current measurement at a voltage regulator for the plurality of devices during the current control period, the power meter hardware module including:
an activity module adapted to determine activity of the plurality of devices over the current control period;
an activity energy estimate module adapted to determine estimated energy consumption for the plurality of devices over the current control period based on the activity of the plurality of devices over the current control period;
an energy measurement module adapted to determine an amount of measured energy consumed over the current control period based on a power related measurement at a voltage supply for the plurality of devices; and
an energy meter module adapted to determine the representation of power consumption of the plurality of devices over the current control period based on a combination of the estimated energy consumption for the plurality of devices over the current control period and the amount of measured energy consumed over the current control period;
a power budget hardware module adapted to determine a representation of a power budget for at least a device of the plurality of devices based on the representation of power consumption of the plurality of devices and a power limit for the power domain; and
a performance hardware module adapted to determine a maximum performance metric for the device of the plurality of devices based on the representation of the power budget for the device.

2. The apparatus of claim 1, wherein the plurality of devices are selected from a group consisting of a plurality of memory devices, a plurality of asymmetric devices on an integrated circuit, a plurality of processors on an integrated circuit, and a plurality of processor cores on the processor.

3. The apparatus of claim 1, further comprising a power control unit including a storage medium to hold power code and a processing element to execute the power code, wherein the activity module comprises one or more counter(s) to track activity of the plurality of devices over the current control period, the activity energy estimate module includes energy estimate code of the power code, the energy measurement module includes energy measurement code of the power code, and the energy meter module includes energy meter code of the power code.

4. The apparatus of claim 1, wherein the representation of the power budget for at least the device of the plurality of devices over a next control period includes a representation of an energy budget for at least the device of the plurality of devices over the next control period, and wherein the power budget hardware module includes,
a power cap module adapted to determine an energy budget for the plurality of devices for the next control period based on the representation of power consumption of the plurality of devices over the current control period in relation to the power limit for the power domain over a time window; and
a device budget module adapted to determine the representation of the power budget for at least the device over the next control period based on the power budget for the plurality of devices for the next control period.

5. The apparatus of claim 4, wherein the maximum performance metric for at least the device includes a maximum number of transactions associated with the device over the next control period, and wherein the performance hardware module includes a performance limiter module to determine the maximum number of transactions associated with the device over the next control period based on the representation of the power budget for at least the device over the next control period and a scale factor associated with a power versus bandwidth characteristic of the device.

6. The apparatus of claim 5, further comprising: a controller adapted to limit a number of transactions intended for the device to the maximum number of transactions over the next control period.

7. A method comprising:
determining, in a power control unit (PCU) comprising a microcontroller to execute power code stored on a non-transitory medium, a representation of an amount of power consumed by a power domain including a plurality of devices including a plurality of memory devices over a current control period based on a power related measurement including a current reading at a voltage regulator for the plurality of devices for the current control period associated with the plurality of devices, the representation of the amount of power including an amount of energy consumed by the domain over the current control period;

determining, in the PCU, a representation of a power budget over a next control period for each of the plurality of devices based on the representation of the amount of power consumed by the power domain over the current control period;

determining, in the PCU, a maximum performance metric over the next control period for each of the plurality of devices based on the representation of the power budget over the next control period for each of the plurality of devices; and limiting the plurality of devices to the maximum performance metric over the next control period, wherein the representation of the power budget over the next control period for each of the plurality of memory devices includes an energy budget over the next control period for each of the plurality of memory devices, and wherein determining an energy budget over the next control period for each of the plurality of memory devices based on the amount of energy consumed by the power domain over the current control period comprises:

determining an energy budget for the power domain over the next control period;

determining an amount of time each memory device of the plurality of memory devices is throttled during the current control period; and determining the energy budget over the next control period for each of the plurality of memory devices based on allocating the energy budget for the power domain over the plurality of memory devices to minimize the amount of time each memory device is throttled during the current control period.

8. The method of claim 7, wherein determining a representation of an amount of power consumed by a power domain including a plurality of devices over a current control period is further based on an estimate of energy consumed by the power domain over the current control period, and wherein determining a representation of an amount of power consumed by a power domain including a plurality of devices over a current control period is further based on an estimate of energy consumed by the power domain over the current control period comprises:

determining activity per RANK of the memory devices over the current control period; and determining the estimate of energy consumed by the power domain over the current control period based on a combination of the estimate of energy consumed by the power domain over the current control period and the current reading at the voltage regulator for the plurality of devices.

9. The method of claim 7, wherein the maximum performance metric includes a maximum number of transactions, and wherein determining a maximum number of transactions over the next control period for each of the plurality of memory devices based on the energy budget over the next control period for each of the plurality of devices comprises determining the maximum number of transactions over the next control period for each of the plurality of memory devices based on the energy budget over the next control period for each of the plurality of memory devices in combination with a power and bandwidth characteristic for each of the plurality of memory devices.

10. The method of claim 9, wherein limiting the plurality of memory devices to the maximum number of transactions over the next control period comprises:

determining a smaller maximum number of transactions, which is smaller than the maximum number of transactions, for each of the plurality of memory devices over a time frame, which is smaller than the next control period;

counting a number of transactions to issue to each of the plurality of memory devices during the time frame; and limiting issuing transactions to each of the plurality of memory devices in response to the number of transactions to issue to each of the plurality of memory devices during the time frame to reach the smaller maximum number of transactions.

11. A non-transitory medium including code, when executed, to cause a machine to perform the operations of:

determining a power and bandwidth characteristic for each memory device of a plurality of memory devices; and exposing the power and bandwidth characteristic for each memory device to a memory performance limiting module adapted to determine a maximum performance limit for each memory device over a first amount of time based on a power limit for the plurality of memory devices over a second amount of time.

12. The non-transitory medium of claim 11, wherein the power and bandwidth characteristic is selected from a group consisting of a power scale factor for each memory device of the plurality of memory devices, weights for each memory device of the plurality of memory devices, a RANK present vector, a channel to voltage regulator map, a gain factor for each memory device of the plurality of memory devices, maximum power for the power domain, minimum power for the power domain, and average power of the power domain.

13. The non-transitory medium of claim 11, wherein determining the power and bandwidth characteristic for each memory device of a plurality of memory devices comprises running one or more test patterns to characterize the power and bandwidth characteristic for each memory device.

14. The non-transitory medium of claim 11, wherein the power and bandwidth characteristic for each memory device of the plurality of memory devices includes an average power of the power domain, and wherein determining the average power of the power domain comprises polling a voltage regulator for the power domain at a start of a time period, polling the voltage regulator for the power domain at an end of the time period, determining the change in energy from the start of the time period to the end of the time period, and determining the average power of the power domain based on dividing the change in energy by the time period.

15. The non-transitory medium of claim 11, wherein exposing the power and bandwidth characteristic for each memory device to a memory performance limiting module comprises writing a representation of the power and bandwidth characteristic for each memory device to the memory performance limiting module.

16. The non-transitory medium of claim 11, wherein exposing the power and bandwidth characteristic for each memory device to a memory performance limiting module comprises allowing the memory performance limiting module to read a representation of the power and bandwidth characteristic for each memory device.

* * * * *